United States Patent Office 3,442,182
Patented May 6, 1969

3,442,182
TUBULAR HOUSING STRUCTURES
Frank Eustace Brittain, Chasetown, near Walsall, England, assignor to Girling Limited, Birmingham, England, a British company
Filed May 12, 1967, Ser. No. 638,116
Claims priority, application Great Britain, May 19, 1966, 22,218/66
Int. Cl. F16j 3/00
U.S. Cl. 92—99                                              4 Claims

ABSTRACT OF THE DISCLOSURE

The invention relates to a booster housing primarily for use in servo assisted vehicle brake systems, the housing being constructed in two parts which are secured together in axially aligned relation. A locking ring is provided to lock the housing parts in their secured condition and engages over radially outwardly directed flanges formed on the housing parts where they butt together. The locking ring at one side axially overhangs one of the flanges and is provided at its other side with abutment means engaging the adjoining flange. The overhanging side of the locking ring is locally deformed to present locking means which on rotation of the ring relative to the housing parts cooperate with the other flange to urge the two flanges axially towards one another to hold the housing parts in secured relation. The said other flange is shaped to accept the locking ring by permitting axial movement thereof relative to the housing parts in one rotational position of the ring, the locking means becoming effective when said ring is turned out of said rotational position.

---

Figure 1:
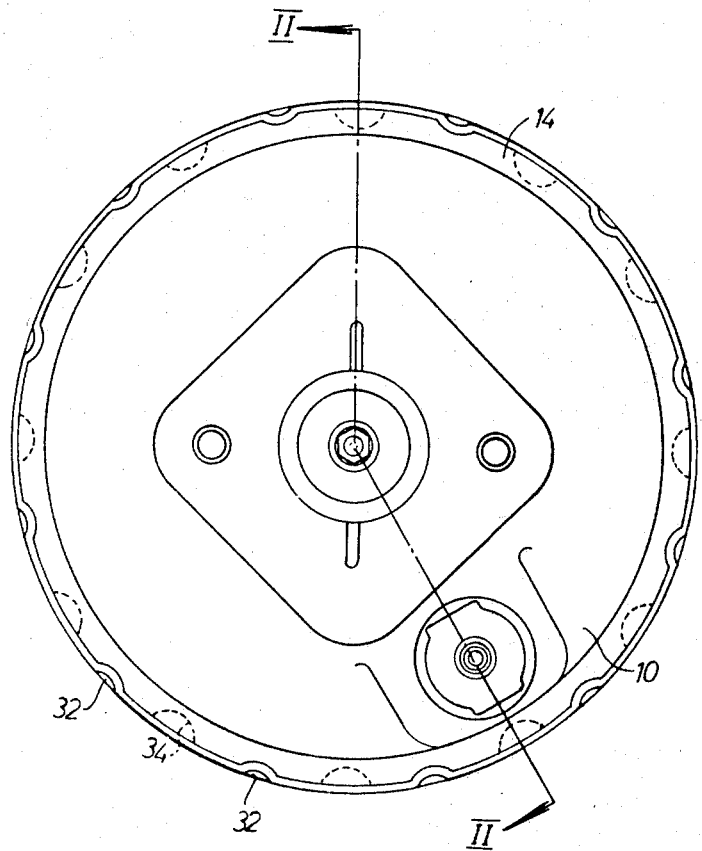

This invention relates to tubular housing structures.

Tubular housing structures, for example, for vehicle servo brakes conventionally comprise a pair of generally tubular members which are held in telescoping relation as by inter-engaging tabs and slots formed in the tubular members themselves, locking of the two housing parts being accomplished by relatively rotating same in order to engage the tabs of the one housing part behind flanges or equivalent members of the other housing part. This construction has the disadvantage that, where a bead or similar fluid seal is required to be trapped between the two housing parts, the relative rotation which is necessary to lock those two parts together creates an elastic distortion of the bead which may seriously impair its sealing effect.

It has already been proposed to avoid relative rotation between the two housing parts by providing one of those parts with tabs which can be bent out of their initial positions to maintain said parts locked together following an axial telescoping movement thereof and a consequent axial compression of the fluid seal. Such tabs require to be bent back towards their initial positions should the housing parts subsequently need to be separated, however, and metal fatigue is set up, resulting in reduced tab strength when the housing parts are re-assembled and locked together and eventually leading to tab failure and breakage. Again, if the telescoping nature of the two housing parts demands that one of those parts should have an enlarged diameter portion provided with the tabs and dimensioned to receive the other housing part, and if that enlarged diameter portion should be offset from the remainder of the housing part on which it is formed, then there is a tendency for the axial recovery force of the fluid seal, acting through the inner telescoped housing part and against the bent tabs, to expand said enlarged diameter housing portion radially outwards. In an extreme case, any such expansion of said enlarged diameter portion could result in disengagement of the tabs from the locked housing part.

It is an object of the invention to eliminate the torsional stress which is produced by relative rotation of the two housing parts.

Another object of the invention is to avoid the need for fatigue-sensitive metal tabs and to eliminate any possibility of a housing part, being dangerously expanded by any radially outwardly directed forces transmitted through such tabs.

According to the broadest aspect of the present invention, a separate locking ring is employed for securing two parts of a tubular housing structure together and is provided with locking means for engaging portions of said tubular parts to lock the same in adjoining relation when said ring is rotated relative to said housing parts.

More particularly, a tubular housing structure according to the present invention comprises at least a pair of axially adjacent housing parts having their adjoining ends each provided with a radially outwardly directed circumferential flange, a locking ring peripherally embracing said flanges and having one edge region axially overlying the same at one side thereof, the axially overlying region of said ring being locally inwardly deformed at circularly spaced intervals and the flange past which said region extends being radially recessed at similar circular intervals, whereby in the assembly of said structure the last mentioned flange is enabled to be introduced axially into said locking ring by registering said recesses with the local deformation of said ring, and abutment means on said ring for engaging the other flange and providing a reaction for a locking pressure maintained by turning said ring relative to said housing parts to displace said local deformations out of register with said recesses.

Although the abutment means may comprise local deformation on the ring similar to those referred to above, in which event said other flange is also radially recessed to permit axial introduction of that flange into the ring, it may alternatively be provided by turning down the other edge region of the ring to present an inwardly directed lip or a series of inwardly directed tabs.

Figure 2:
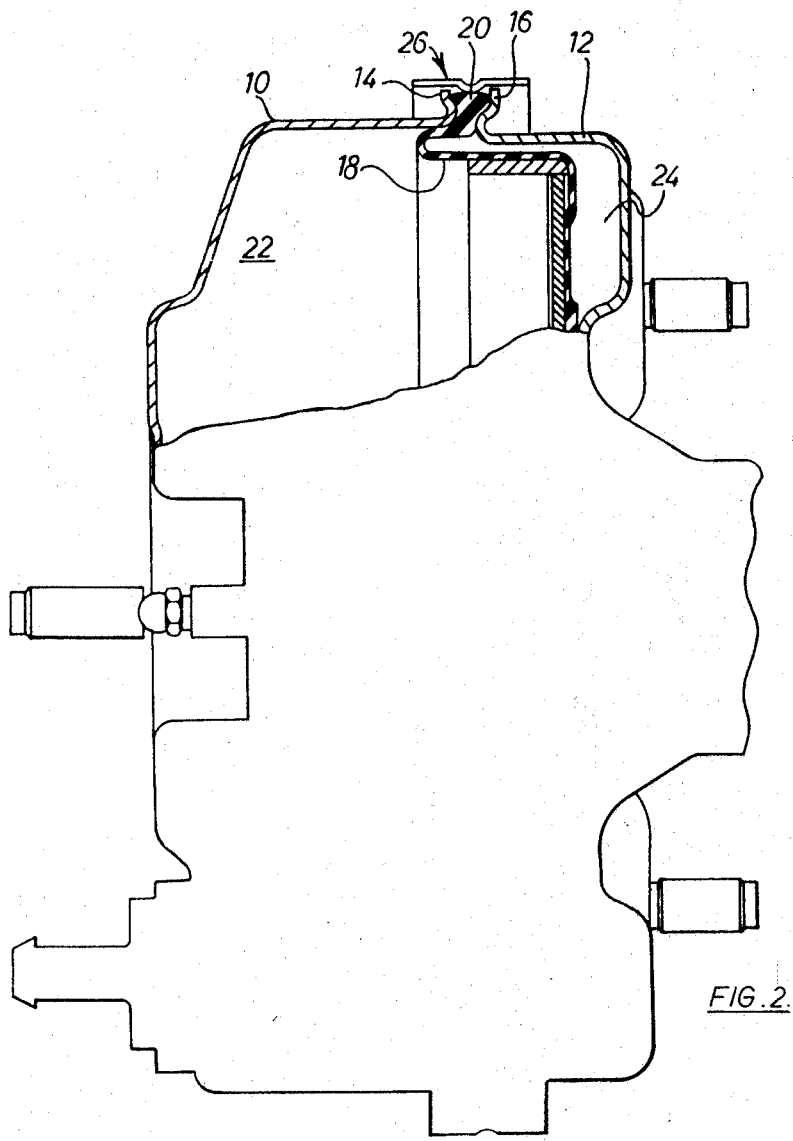
Figure 3:
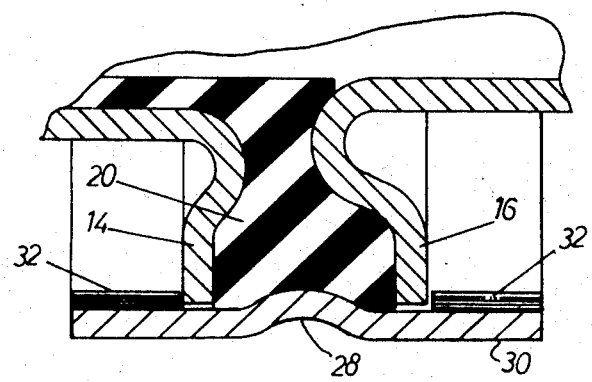
Figure 4:
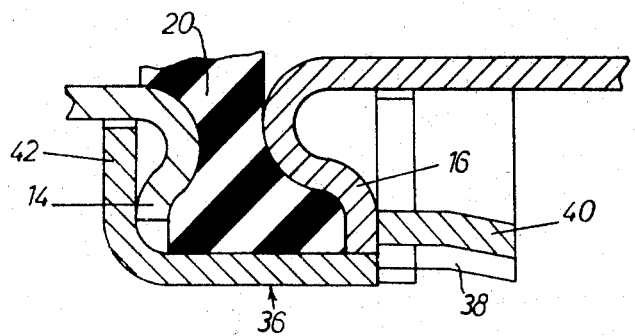

The invention will be described further, by way of example, with reference to the accompanying drawings, in which:

FIG. 1 is an end elevation of a booster housing for use in a vehicle braking system and embodying the invention, FIG. 2 is a side elevation thereof, partly in section on the line II—II of FIG. 1, FIG. 3 is a sectional detail to an enlarged scale of the junction between the two parts of the booster housing, and FIG. 4 is a sectional detail similar to that of FIG. 3 of a modification of the invention.

The booster housing shown in FIGS. 1 and 2 comprises a pair of generally tubular housing parts 10 and 12 formed at their open ends with radially outwardly directed flanges respectively designated 14 and 16. Between the flanges 14 and 16 of the housing parts is clamped the peripheral bead 20 of an elastic diaphragm 18 which divides the interior of the assembled housing into two chambers 22 and 24 adapted to any convenient manner to be selectively supplied with air at different pressures in order to subject the diaphragm 18 to a differential air pressure which will cause it to be moved axially of the housing. It will be observed that the peripheral bead 20 of the elastic diaphragm 18 constitutes an air seal for the booster housing and that consequently, it is desirable to avoid placing that bead under any stress which would impair its sealing efficiency.

For the purpose of maintaining the two housing parts 10 and 12 secured together in their adjoining and axially aligned relation, the invention provides a locking ring 26 which embraces the two flanges 14 and 16. The locking ring 26 has a central, dished groove 28 which serves to locate the ring between the flanges 14 and 16 and is provided on each side of the groove 28 with portions 30 which overlie the flanges and extend a substantial distance axially beyond the same. The axially extended portions 30 of the locking ring 36 are locally inwardly deformed at regularly circularly spaced intervals to present depressions 32, whilst the flange 16 is formed with similarly circularly spaced recesses or notches 34 by which the flanges 14 and 16 are enabled to be passed into the locking ring 26 when the notches 34 and the depressions 32 are in alignment with one another. Thereafter, the connection between the two housing parts 10 and 12 is completed by rotating the ring 26 relative to the two housing parts, to move the recesses out of alignment with the depressions 32. It will be noted that, as a result of the provision of the locking ring, which is the only member of the housing structure which is rotated, there is no relative circular movement between the flanges 14 and 16 on the one hand and the bead 20 of the diaphragm 18 on the other hand, so that the bead 20 remains undistorted and its sealing efficiency is unimpaired.

In the embodiment of the invention described immediately above, the locking ring 26 is provided with symmetrically arranged axially extending portions 30, and both the portions 30 are provided with the locally deformed depressions 32, so that when the ring is used to lock two housing parts together, the reaction for the locking pressure exerted by one set of depressions 32 is provided by the other set of depressions on the other flange. FIG. 4 shows a modification of the invention wherein the locking ring 36 is provided with an axially extending portion 38 at one side only of the ring, the axially extended portion 38 being provided with circularly spaced local depressions 40 similar to the depressions 32 previously described. At its other side, the locking ring 36 is turned through 90° to define a radially inwardly directed lip 42 which co-operates with the flange 14 to provide a reaction for the locking pressure maintained by the depressions 40 against the flange 16 when the locking ring 36 is rotated relative to the two housing parts. It will be appreciated that, since only one side of the locking ring 36 is formed with local depressions 40, the flange 16 is formed with peripheral recesses similar to to the recesses 34 shown in FIG. 1.

By virtue of the independent locking ring 26 or 36 provided by the invention, relative rotation between the two housing parts 10 and 12 is rendered unnecessary so that no torsional stresses are applied to the diaphragm bead 20. At the same time, the need for bendable tabs on a housing component such as the flanges 14 or 16 is avoided and axial forces arising from the tendency of the bead 20 to revert to an uncompressed condition are accommodated by the ring 26 or 36 and are thereby prevented from affecting either the flanges 14 or 16 or any other part of the booster housing. Since no part of the booster housing is therefore called upon to resist forces tending to deform it radially and/or axially as a result of the bead restoring forces, the housing can be made of a thinner and/or a lower quality metal than has hitherto been considered practicable.

I claim:

1. A tubular housing structure comprising at least a pair of axially adjacent housing parts having their adjoining ends each provided with a radially outwardly directed circumferential flange, a locking ring peripherally embracing said flanges and having one edge region axially overlying the same at one side thereof, the axially overlying region of said ring being locally radially inwardly deformed at circularly spaced intervals and the flange past which said region extends being radially recessed at similar circular intervals, whereby in the assembly of said structure the last mentioned flange is enabled to be introduced axially into said locking ring by registering said recesses with the local deformations of said ring, and abutment means on said ring for engaging the other flange and providing a reaction for a clamping pressure maintained by turning said ring relative to said housing parts to displace said local deformations out of register with said recesses.

2. A tubular structure as claimed in claim 1, in which the abutment means comprises further and similar local deformations on the ring at a region thereof axially spaced from the first mentioned deformations, said other flange also being radially recessed to permit axial introduction of the flange into the ring.

3. A tubular structure as claimed in claim 1, in which the other edge region of the ring is turned down to present an inwardly directed lip or a series of inwardly directed tabs.

4. A vehicle brake booster or servo motor housing comprising a pair of generally cylindrical and axially aligned housing parts each provided at one end with a radially outwardly directed circumferential flange, said housing parts being arranged adjacent and in axial alignment with one another, a flexible diaphragm isolating the interior of said housing parts from one another, said diaphragm having a peripheral bead which is clamped between said circumferential flanges, a locking ring peripherally embracing said flanges and axially overlying the same at both sides thereof, each axially overlying region of said ring being locally radially inwardly deformed at circularly spaced intervals and said flanges being radially recessed at similar intervals, whereby in the assembly of said booster housing the locking ring is enabled to be passed over said flanges by registering the local deformations of the ring with the recesses in the flanges and a clamping pressure on said bead set up by urging said two housing parts axially together is maintained by turning said ring relative to said housing parts to displace said local deformations out of register with said recesses.

References Cited

UNITED STATES PATENTS

| 786,607 | 4/1905 | Mann | 285—362 |
| 2,198,922 | 4/1940 | Shaw | 285—362 |
| 3,053,235 | 9/1962 | Hager | 92—99 |
| 3,146,682 | 9/1964 | Price et al. | 92—99 |

PAUL E. MASLOUSKY, *Primary Examiner.*

U.S. Cl. X.R.

92—169; 220—40